Dec. 9, 1952          G. K. HARTMANN          2,620,652
PELLET CRUSHER PRESSURE GAUGE
Filed Dec. 7, 1949          2 SHEETS—SHEET 2

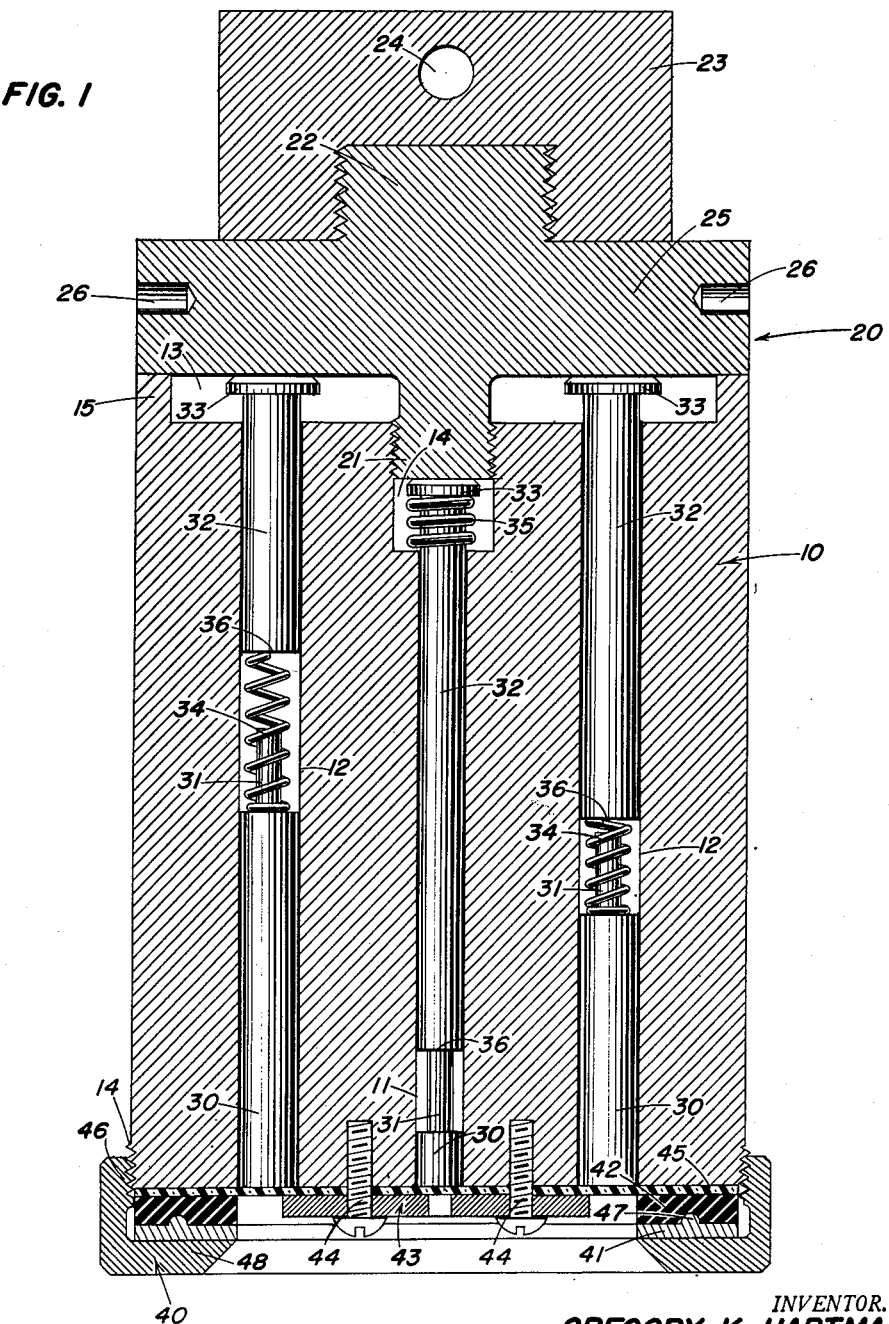

INVENTOR.
GREGORY K. HARTMANN
BY G. D. O'Brien
ATTORNEY

Patented Dec. 9, 1952

2,620,652

UNITED STATES PATENT OFFICE 2,620,652

PELLET CRUSHER PRESSURE GAUGE

Gregory K. Hartmann, Garrett Park, Md.

Application December 7, 1949, Serial No. 131,652

9 Claims. (Cl. 73—35)

(Granted under the act of March 3, 1883, as amended April 30, 1928; 370 O. G. 757)

The present invention relates to pellet crusher pressure gauges, and more particularly to such a gauge designed for measuring high underwater pressures, such as those resulting from submarine explosions.

The conventional submarine explosion pressure gauges are of the pellet crusher or compression type, wherein a copper pellet is mounted upon one end of a piston which is caused to move through a piston chamber in response to the application of pressure to the other end thereof, to drive the copper pellet against a fixed anvil there located. Since such conventional gauges are designed particularly for underwater measurements, they are provided with a water pressure equalization chamber formed substantially coextensive with the piston chamber, connected thereto at the anvil end thereof, and provided with a seepage port substantially adjacent the exposed end of the piston chamber. Thus, as such a gauge is lowered to various depths under water, the increased water pressure causes a seepage of water into the piston chamber, in the space between the piston and the chamber wall, and into the equalization chamber until the internal and external pressures are equal. When this gauge is placed under water to the desired depth and in the desired locality with respect to an underwater explosion, the shock wave resulting from the explosion is exerted against the exposed end of the piston to drive the same along the piston chamber and cause the copper pellet mounted on the other end of the piston to be impacted against the anvil at one end of the chamber. From the resultant deformation of the copper pellet, the pressure of the shock wave impinged upon the gauge can be calculated.

It is frequently desirable in determining the characteristics of such a shock wave to obtain pellet compression measurements at a plurality of time intervals of pellet to anvil impact from the moment of explosion. In order to obtain this data for any particular locality with respect to the explosion source, it is the general practice to provide a plurality of piston to anvil travel lengths, which may be accomplished by varying the lengths of the pistons or by varying the overall lengths of the piston chambers employed. Heretofore, the common practice for obtaining such data has been to employ a plurality of such gauges constructed with the desired variations in the above-mentioned characteristics and placing the several gauges in the same vicinity under water, thereby enabling the desired determinations. However, in order to prevent interference of the several gauges with each other during the determination, it is necessary to place them a substantial distance apart. When the determination is being made at a relatively great distance from the explosion source, the errors resulting from the relative spatial displacements of the several gauges from each other is small, but when it is desired to make the determination at a point in relatively close proximity to the explosion source, the errors resulting from the spacing of the several gauges become quite appreciable, making accurate determinations by this method impossible.

Since it is frequently desirable to obtain the pressure characteristics of an underwater explosion at a distance from the explosion source which would result in substantial damage to the hull of a warship or merchant ship or the like, the gauge comprising the present invention, which is a modification and improvement of the conventional type gauge above described, is designed to enable the analysis of such a pressure wave with respect to time in close proximity to the explosion source. To this end, the present invention generally provides for a single gauge containing a plurality of piston chambers, a plurality of pistons, and if desired, a plurality of anvils, thereby enabling, through variations in the piston masses and in the piston to anvil travel lengths, determinations of the desired data at substantially a single position from the explosion source.

It is, therefore, one object of the present invention to provide a pellet crusher or compression type gauge enabling the simultaneous determination of a plurality of values of a pressure wave's characteristics with respect to time.

Another object of the present invention is to provide such a gauge enabling the simultaneous determination of a plurality of values of a pressure wave's characteristics at a plurality of time intervals from the moment of explosion, by providing the gauge with a plurality of pistons having various travel lengths from starting position to contact with the anvil.

Another object of the present invention is to provide such a gauge enabling the simultaneous determination of a plurality of values of an underwater explosion pressure wave's characteristics at a single position from the explosion source and at a plurality of time intervals from the moment of explosion, by providing such a gauge with a plurality of pistons having different travel times from starting position to contact with the anvil, by varying the piston lengths and/or the anvil positions.

Another object of the present invention is to provide a watertight submarine explosion pressure gauge of the pellet compression type enabling any desired angular orientation of the gauge.

A further object is the provision of a multiple-time-interval crusher gauge adapted to record information about the initial stages of an explosion pressure pulse.

Other objects and advantages of the present invention will become apparent to those skilled in the art from a consideration of the following detailed description thereof, made in conjunction with the accompanying drawings in which like numerals refer to like or corresponding parts and wherein:

Fig. 1 is an enlarged longitudinal sectional view of one embodiment of the present invention;

Figure 2:
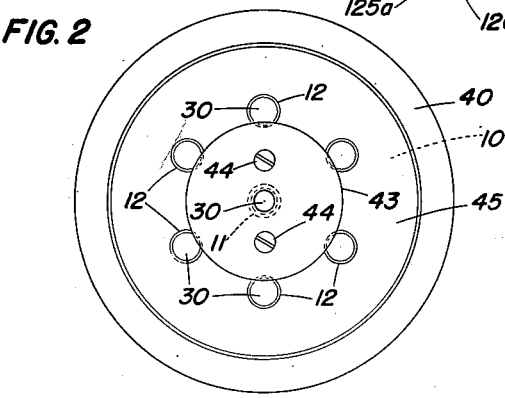
Fig. 2 is a reduced bottom face view of the embodiment shown in Fig. 1.

Considering first the modification of the present underwater explosion pressure gauge shown in Figs. 1 and 2, it comprises a main barrel 10, a cover cap 20 for the upper end thereof, and means for sealing the bottom end from water. A circular recess 13 is formed in the upper end of the barrel 10 to provide the circumferential upwardly extending flange 15, and substantially centrally located within the recessed portion 13 there is provided a partially threaded bore 14 extending into the barrel 10. The barrel is further provided with a plurality of bores 12 extending the entire length thereof from the recessed portion 13 to the bottom end of the barrel, forming a plurality of piston chambers, and if desired, an additional piston chamber 11 may be had by providing a similar bore extending from the end of the bore 14 to the bottom end of the barrel 10.

The cover cap 20 is formed with a main body portion 25 preferably having the same external diameter as that of the barrel 10, with a bolt portion 21 extending downwardly from a central position on the bottom surface of the main body portion 25, and with another bolt portion 22 extending upwardly from a central point on the upper face thereof. In addition a tie block 23 is removably mounted upon the bolt 22 and has an opening 24 therethrough for securing a guide-line or the like. In affixing the cover cap 20 in position upon the barrel 10, the bolt 21 thereof is threaded into the partially threaded bore 14 until the periphery of the main body portion 25 of the cover cap abuts the annular flange 15 formed on the barrel 10, thereby sealing the top end of the barrel.

At the opposite end of the barrel 10 there is provided means for sealing off the bottom openings of the piston chambers. This sealing means comprises the water impervious rupturable disk 45, of cellophane or like material, substantially covering the entire bottom end of the barrel, the gasket ring 42 of rubber or other suitable gasket material superimposed upon the cellophane disk around the peripheral portion thereof, the metal bearing ring 41 superimposed upon the gasket ring 42 and formed with an annular compression ridge 47 extending from the gasket engaging surface thereof for facilitating the compression of the gasket or sealing ring 42, and a clamping ring 40 having threaded portion 46 cooperating with the threaded portion 14 of the barrel 10 for positioning this ring thereon, and being further formed with the inwardly extending shoulder 48 designed to clamp against the bearing ring 41 when threaded into position upon the barrel, thereby sealing the bottom end of the piston chambers by compression of the gasket ring 42 against the disk 45. If desired, a second gasket ring may be inserted between the disk 45 and the end of the barrel.

Several pistons 30 of varying lengths and masses are positioned in the several piston chambers 11 and 12 and are retained therein and prevented from outwardly distending the cellophane disk 45 by means of the retaining washer 43, which is affixed to the bottom end of the barrel by means of the screws 44, the washer being so shaped and positioned as to partially block the bottom ends of the several piston chambers, as is clearly shown in Fig. 2. Mounted on the upper end of each piston is a compression pellet 31 of copper or the like of the desired dimensions. Also inserted in each of the piston chambers is an anvil 32 being formed with the flanged head 33 to limit its entrance into the chamber. Interposed between each piston located in the chambers 12 and its associated anvil there is a helical spring 34 of the desired dimension and shape so as to prevent inward distentions of the cellophane disk at increased water pressures and to maintain the anvils and pistons in the desired starting position to provide the determined piston to anvil travel distances, holding the bottom end of each piston against the retaining washer and the top end of each anvil against the cover cap. If desired, the piston and anvil located in the central piston chamber 11 may be arranged to provide for zero travel distance therebetween. In this event, it is preferable that the spring 35 be placed between the head 33 of this anvil and the base of the bore 14, the advantage to be derived from this positioning of the spring 35 is considered subsequently. In this arrangement of the central chamber 11, the anvil and piston positioned therein are chosen of such lengths that, when thus positioned with a compression pellet mounted upon the piston, the upper end of the pellet just abuts the anvil when the cover cap is tightly closed to the barrel.

In assembling the present device, the sealing means is first applied to the bottom end of the barrel by positioning the cellophane disk 45 thereon, placing the gasket ring 42 in position over the cellophane disk, positioning the bearing ring 41 over the gasket ring, and then clamping these elements in position by threading the clamping ring 40 onto the barrel 10 providing a watertight seal about the periphery of the cellophane. Next, the piston retaining washer 43 is positioned over the cellophane and the screws 44 threaded into the barrel 10 to hold the washer in position. Since the screws 44 puncture the cellophane disk 45, to maintain a watertight seal it is desirable that the cellophane adjacent surface of the retaining washer and the underside of the screwheads be painted with collodion, fingernail polish, or the like before being mounted in place. Thereupon, the several pistons 30 of the desired length with the desired pellets 31 cemented or otherwise affixed to one end thereof are slipped into position in their respective chambers through the upper openings thereof. The springs 34 are then positioned through the upper opening in the chambers 12 and the anvils 32 of the desired lengths are inserted therein. In central chamber 11, however, after the piston 30 is positioned therein, the spring 35 is slipped over the anvil to be placed therein until it abuts the head 33 thereof, and the anvil is then positioned in the chamber. Following the positioning of all of the anvils, the cover cap 20 is positioned on the barrel 10 by threading the bolt 21 thereof into the threaded portion of the bore 14 until the main body portion 25 of the cover cap securely abuts the shoulder 15 formed on the barrel, and the guide block 23 is then threaded onto the bolt 22 of the cover cap 20. The cover cap is provided with a pair of spanner wrench sockets 26 to facilitate the tightening of the cover cap against the shoulder 15, and if desired, a suitable watertight seal may be formed between the shoulder 15 and the cover cap, as for example by coating these engaging surfaces with fingernail polish, collodion, or the like and then placing cellulose tape or the like around the exterior of the sealed joint. The anvil heads 33 of the anvils contained in the chambers 12 now each abut the main body portion 25 of the cover cap, while the anvil head of the anvil contained in the chamber 11 abuts the end of the threaded bolt 21 and is forced into position in its chamber against the compression of its spring 35. The pellet striking surface 36 of this anvil now abuts the pellet 31 carried by the piston 30, providing in this instance for zero travel distance of the piston. The advantage to be derived from this arrangement of the central chamber 11 resides in the fact that the relatively great compression of the spring 35 which may be obtained operates as a locking means for the cover cap, lessening its tendency to loosen and to enable seepage of water into the several piston chambers, which would result in a faulty determination.

In operation, the present gauge is lowered into the water to the desired depth at the chosen locality by means of a guideline affixed thereto through the guideline block 23. Upon the occurrence of an underwater explosion, a shock wave hits the gauge and immediately ruptures the cellophane disk 45 at each piston chamber bottom opening enabling the shock wave pressure to impinge upon the lower ends of the pistons 30, causing them to travel along the piston chambers 12 against the compression of springs 34 until the copper pellets 31 are impacted against the anvil striking surfaces 36, and resulting in a deformation in these pellets in accordance with the pressure exerted by the piston at the time of striking the anvil. Since the piston masses and travel distances have been made different in each chamber, the time interval between the explosion and the striking of the copper pellet against the anvil is different in each instance, thereby enabling a determination from the various pellet deformations of the pressure wave characteristics with respect to time.

Figure 3:
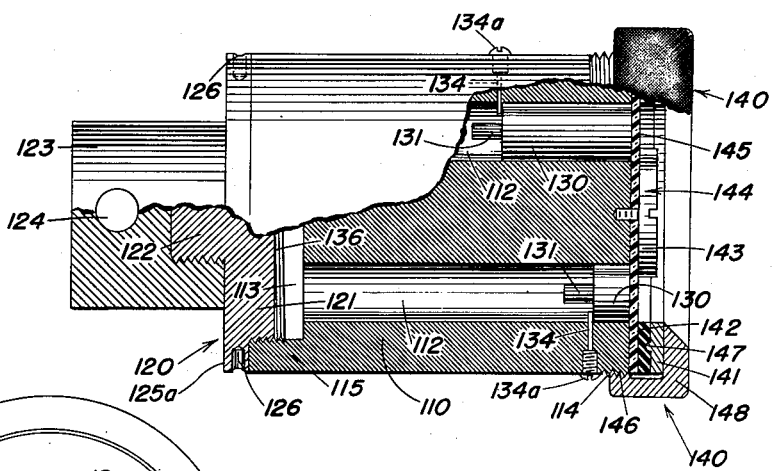
Fig. 3 is a partially sectional and partially elevational view of a second embodiment of the present invention.

The modification of the present gauge shown in Fig. 3 is designed to accomplish the same results as the above-described modification and in substantially the same manner. This modification is provided with the barrel 110 having the piston chambers 112 formed therein and extending substantially the length thereof. A circular recess 113 is formed in one end of the barrel 110 providing an extending circumferential shoulder 115, the internal sides of which are partially threaded to receive the externally threaded portion 121 of the cover cap 120. The cover cap is further provided with the radially extending circumferential shoulder 125a which engages the extending shoulder 115 of the barrel when the cover cap is threaded into the recess 113, and is also provided with the extending bolt 122, upon which is threaded the guide block 123 having the guideline opening 124 formed therein. The other end of the barrel 110 is sealed in the same manner as the preceding embodiment, being provided with the disk 145 of cellophane or the like designed to cover the ends of each of the piston chambers 112 there located, and this disk is sealed about its periphery by means of the gasket ring 142, bearing ring 141 having the annular compression ridge 147 formed on the gasket engaging face thereof, and the clamping ring 140 having the threaded portion 146 and the inwardly extending shoulder 148. The piston chambers 112 are provided with pistons 130 of varying lengths and masses upon which are mounted the copper compression pellets 131. To keep the pistons from riding up in their respective chambers and to prevent inward distention of the cellophane disk 145, as would normally result from the increase of external pressure from the lowering of the gauge to a substantial depth of water, the present embodiment is provided with the frangible retaining pins 134, entering into the chambers 112 through suitable openings formed in the side of the barrel 110, so positioned along the length thereof to enable the pins to engage the upper ends of their respective pistons. Once these frangible pins are positioned in place, the openings therefor are made watertight by provision of the screws 134a designed to cover and seal these openings. To prevent the pistons 130 from causing an outward distention of the cellophane disk 145, a retaining screw 144 is threaded into the central portion of the barrel 110 through the cellophane disk 145 and is provided with a head 143 of sufficient diameter to partially cover the bottom end of each of the piston chambers 112. Instead of the plurality of removable anvils 32 provided in the above-described embodiment of the present invention, the present modification provides but a single anvil 136 afforded by the face of the threaded portion 121 of cover cap 120 which enters into the recess 113 formed in the barrel.

In operation, when the present gauge is positioned under water and exposed to an explosion shock wave, the cellophane disk 145 is ruptured at the bottom end of each piston chamber, as in the case of the preceding embodiment, enabling the pressure wave to impinge upon the several pistons 130, causing them to break their respective frangible retaining pins 134, to traverse their respective piston chambers 112, and to impact their respective compression pellets 131 against the anvil 136 at various time intervals from the inception of the explosion shock wave in accordance with their respective masses and travel distances. The characteristics of the shock wave with respect to time may be determined from the observed deformation of the compression pellets. If desired, insurance against the seepage of water into the barrel 110 may be obtained in the same manner as for the preceding embodiment, by appropriately coating the engaging surfaces of the cover cap 120 and the barrel 110 and the undersurfaces of the screws 134a and 144.

Figure 4:
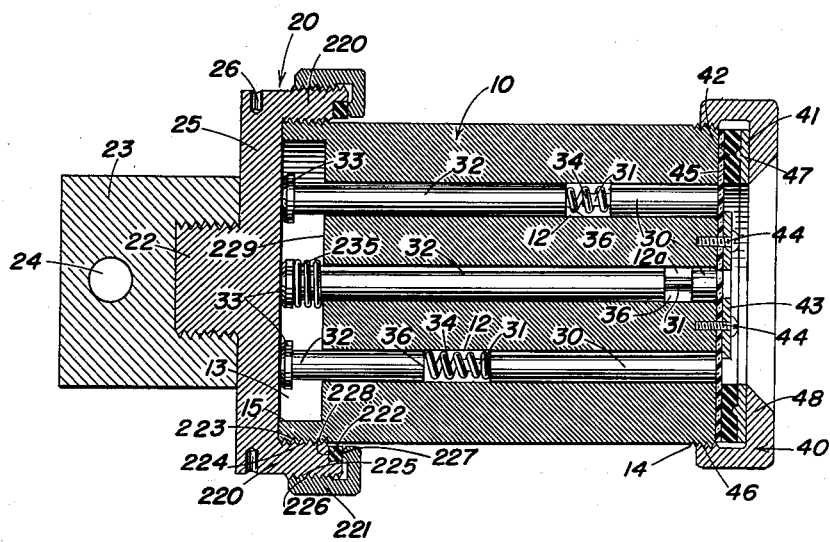
Fig. 4 is a longitudinal section of a third embodiment of the present invention.

In the embodiment of the present invention shown in Fig. 4, the form shown in Figs. 1 and 2 has been modified to provide for external attachment of the cover cap 20 to the barrel 10, rather than the internal attachment shown in the earlier described embodiments. To this end, the main body portion 25 of the cover cap 20 is provided with the circumferential flange 220 having the internal threads 224 cooperating with the external threads 223 on one end of the barrel 10 to secure the cover cap 20 thereto. Also, this flange 220 is provided with the external threads 225 enabling the positioning thereon of a bearing ring 221 by the cooperation of the internal threads 226 thereof with the external threads on the flange 220. This flange is further provided with the annular recess 228 wherein is fitted a gasket ring 222, formed of rubber or other suitable gasket material. When the bearing ring is threaded onto the flange 220, its compression portion 227 engages the gasket and compresses it, resulting in a distortion thereof and causing it to engage the exterior surface of the barrel, thereby sealing the upper end of the barrel against the seepage of water.

The records obtainable by use of the gages shown in Figs. 1 and 4 include information about the initial stages of the pressure pulse. The shortest and therefore the lightest piston is assembled in the cylinder with the longest anvil so that it has the shortest distance of travel and thus completes its journey early in the history of the explosion pressure pulse. The graduated lengths of the remaining pistons are so related to the graduated lengths of the anvils associated therewith that the travel times of said pistons vary directly with variations in piston mass. Thus information concerning various stages of the pressure pulse are recorded by these gages.

The arrangement of the piston and anvil in the middle piston chamber 12a is substantially the same as in the corresponding middle piston chamber 11 of Fig. 1. The piston chamber 12a is provided with a piston 30, slidably positioned therein and carrying the copper compression pellet 31 on one end thereof, and the anvil 32, whose impact end 36 engages the compression pellet 31 when the cover cap is securely closed to the barrel. The arrangement of the piston and anvil in this chamber is similar to the arrangement of the corresponding pistons and anvils in the piston chambers 12 of the present and first described embodiment of the present invention, except that there is no spring 34 positioned between the anvil and the piston because of the engagement of the anvil with the copper pellet, but instead, a helical spring 235 is positioned about the anvil for chamber 12a exteriorly of the chamber, bearing between the head 33 of the anvil and the recessed surface 229 of the barrel 10, accomplishing the same effect and result as the spring 35 in the first described embodiment. In all other details except those hereinabove described, the present embodiment is identical to the first described embodiment illustrated in Figs. 1 and 2, and the corresponding identical parts have been correspondingly numbered, the description thereof above made with reference to Figs. 1 and 2 being equally applicable to Fig. 5, and the operation of the present embodiment in determining the characteristics of an explosion pressure wave with respect to time also being identical thereto.

Since the travel of pistons resulting from the explosion pressure wave is rapid and since it is preferably that only a very small difference be provided between the piston and piston chamber diameters to insure proper guiding of the piston in its travel and the maximum effect of the pressure wave on the piston, a back gas pressure is built up ahead of the pistons. To minimize this effect, all or several of the anvils in the embodiments of Figs. 1 and 4 may be slotted along their length, or the piston chambers may be slotted along the anvil containing portions thereof, to provide a ready connection between the various gas pockets in the gauge, thus equalizing all the back pressures and providing a gas pocket of maximum volume.

Thus, in the three embodiments of the present invention herein described, there is provided an improvement of the conventional submarine explosion pressure gauge wherein the characteristics of such a pressure wave may be analyzed with respect to time at a single position with respect to the explosion source. This type of determination is enabled by providing a watertight gauge which permits of a plurality of piston masses and piston to anvil travel distances for a single run in a single gauge. The conventional gauge is limited to only one such travel distance because of the provision for water seepage into the piston chambers between the pistons and their chamber walls. If different length pistons were employed in such a gauge, water would seep into the piston chambers to a depth which would in some instances exceed the length of the piston and would lead to erroneous results, thus seriously limiting the application of the conventional gauge. However, by the provision of a watertight gauge, as is accomplished by the present invention, pistons and anvils of substantially any range of length may be employed and the gauge may be used at substantially any desired water depth, thus greatly enhancing the versatility and adaptability of this type of gauge, enabling more accurate determinations of the type desired, and enabling the characteristics of an underwater explosion shock wave with respect to time to be determined at a single position with respect to the explosion source. In addition, because of the watertight characteristics of the present gauge and because of the provision for holding the pistons and anvils in position before rupture of the sealing disk, the present gauge may be oriented at any desired angle and need not be maintained in vertical position as in the case of the open ended conventional gauges, thus presenting a still further improvement over the former type of gauge.

The three specific embodiments of the present invention herein described in detail are presented merely by way of example, and modifications of the present device not herein specifically mentioned will be apparent to those skilled in the art.

The invention described herein may be manufactured and used by or for the Government of the United States of America for governmental purposes without the payment of any royalties thereon or therefor.

What is claimed is:

1. An underwater explosion pressure gauge of the pellet compression type comprising a barrel having a plurality of piston chambers formed therein, a cap for sealing one end of said barrel, a pressure rupturable waterproof diaphragm sealing the other end of said barrel, a plurality of anvils of varying lengths removably fitted in said chambers and stationed in engagement with said cap, compression pellet carrying pistons of varying lengths slidably positioned in said chambers, and means for holding said pistons in position in said chambers each with an end disposed against said diaphragm prior to the impact of the explosion pressure, the sealing of said barrel to water seepage by said cap and said diaphragm facilitating the employment of pistons of varying lengths thereby enabling the analysis of underwater explosion pressure waves with respect to time at a single position with respect to the explosion source.

2. An explosion pressure gauge of the pellet compression type comprising a barrel having a plurality of piston chambers therein terminating in stationary anvil surfaces at one end portion of the barrel, a plurality of pellet carrying pistons of varying lengths each slidable in a different one of said chambers, and a pressure rupturable diaphragm at the other end portion of the barrel for sealing said chambers against water seepage therein, thereby facilitating the employment of compression pellet carrying pistons of varying lengths in said chambers.

3. A pressure gauge of the type described comprising a barrel having a plurality of piston chambers formed therein, a pressure rupturable means for sealing said chambers against water seepage therein, a plurality of compression pellet carrying pistons of varying lengths slidably positioned in said chambers, a plurality of anvils removably positioned in said chambers, and holding means positioned between corresponding anvils and pistons to hold said anvils and pistons yieldably in position in said chambers.

4. An underwater explosion pressure gauge of the type described comprising a barrel having a piston chamber formed therein, a pressure rupturable diaphragm at one end portion of said barrel and directly exposed to said underwater explosion pressure for sealing said chamber against water seepage therein, a compression pellet carrying piston slidably positioned in said chamber in engagement with said diaphragm, an anvil removably positioned in said chamber at the other end portion of said barrel, and holding means positioned between said anvil and piston to hold said anvil and piston yieldably in spaced position in said chamber, said sealing means facilitating the employment of pistons of various lengths in said chamber.

5. A pressure gauge of the type described comprising a barrel having a plurality of piston chambers formed therein, a first sealing means for sealing one end of said barrel against water seepage into said chambers, a pressure rupturable sealing means for sealing the other end of said barrel against water seepage into said chambers, a plurality of compression pellet carrying pistons of varying lengths slidably positioned in said chambers, a plurality of anvils removably positioned in said chambers, and holding means positioned between corresponding anvils and pistons to hold said anvils and pistons yieldably in position in said chambers.

6. An underwater explosion pressure gauge of the type described comprising a barrel having a piston chamber formed therein, a first sealing means for one end of said barrel for sealing that end against water seepage into said chamber, a pressure rupturable sealing means directly exposed to said underwater explosion pressure for sealing the other end of said barrel against water seepage into said chamber, a compression pellet carrying piston slidably positioned in said chamber in engagement with said rupturable sealing means, an anvil removably positioned in said chamber in engagement with said first sealing means, and holding means positioned between said anvil and piston to hold said anvil and piston yieldably in spaced position in said chamber, said sealing means facilitating the employment of pistons of various lengths in said chamber.

7. A pressure gauge of the type described comprising a barrel having a plurality of piston chambers formed therein, a pressure rupturable diaphragm at one end of the barrel for sealing said barrel against water seepage into said chambers, a plurality of compression pellet carrying pistons of varying lengths slidably disposed in said chambers and initially positioned in engagement with said rupturable diaphragm, anvil surfaces spaced from and facing said pellet carrying pistons, and frangible retaining pins extending into said chambers to hold said pistons in said initial position, the impingement of shock pressure upon said gauge rupturing said diaphragm and causing said piston to break said retaining pins.

8. A pressure gauge of the type described comprising a barrel having a piston chamber formed therein, a pressure rupturable diaphragm at one end of the barrel for sealing said barrel against water seepage into said chamber, a compression pellet carrying piston slidably disposed in said chamber and initially positioned in engagement with said rupturable diaphragm, an anvil surface spaced from and facing said pellet carrying piston, and a frangible retaining means extending into said chamber to hold said piston in said initial position, the impingement of shock pressure upon said gauge rupturing said diaphragm and causing said piston to break said retaining means, said sealing means facilitating the employment of pistons of various lengths in said chamber.

9. A pressure gauge of the type described comprising a barrel having a plurality of cylinders extending throughout its length, a cap removably affixed to said barrel at one end thereof, a pressure rupturable diaphragm affixed to said barrel at its other end, a plurality of compression pellet carrying pistons of varying lengths slidable in said cylinders and initially positioned in engagement with said diaphragm, a plurality of anvils of varying lengths removably fitted in said cylinders and stationed in engagement with said cap, the lengths of said anvils varying inversely with variations in length of said pistons and being such that the distances of free travel and the travel time of said pistons in said cylinders varies directly with variations in piston mass whereby the gauge will record explosion pressures at a plurality of time intervals including the initial stages of an explosion pressure pulse.

GREGORY K. HARTMANN.

REFERENCES CITED

The following references are of record in the file of this patent:

UNITED STATES PATENTS

| Number | Name | Date |
|---|---|---|
| 1,523,290 | Rimailho | Jan. 13, 1925 |
| 2,155,635 | Bennett | Apr. 25, 1939 |
| 2,212,547 | Moseman | Aug. 27, 1940 |
| 2,362,484 | Hickman | Nov. 14, 1944 |
| 2,448,203 | Africano | Aug. 31, 1948 |
| 2,454,793 | Grogan et al. | Nov. 30, 1948 |
| 2,523,474 | Mason | Sept. 26, 1950 |